UNITED STATES PATENT OFFICE.

GEORGE M. RICE, 2D, AND ALFRED L. RICE, OF WORCESTER, MASS.

IMPROVEMENT IN SEPARATING ANIMAL FROM VEGETABLE FIBERS.

Specification forming part of Letters Patent No. 211,109, dated January 7, 1879; application filed July 5, 1878.

*To all whom it may concern:*

Be it known that we, GEORGE M. RICE, 2d, and ALFRED L. RICE, of Worcester, in the county of Worcester and State of Massachusetts, have invented certain new and useful Improvements in the Art of Separating Animal Fibers from Vegetable Fibers; and we declare the following to be a description of our said invention sufficiently full, clear, and exact to enable others skilled in the art to which it appertains to understand and use the same.

This invention relates to certain improvements in the art of separating animal from vegetable fibers in mixed fabrics, or the recovery of wool from mixed rags, or cleansing of wool from burrs, &c., by chemical treatment, and the destruction or disintegration of the vegetable fibers or substances; and our invention consists in the improved method of treatment as hereinafter described, the particular and essential features claimed being definitely specified.

In carrying out our improved process of separation we employ a close vessel or receiver, (a cylindrical shell having end journals, with pipe-couplings and stopped openings therein, is a convenient form,) within which the treatment is principally effected, so that all vapors or fumes of whatever nature are confined with the materials within the receiver until such later stage of the treatment as it shall be desirable to discharge them, at which time they may be conveyed away from the material, as hereinafter described, in a beneficial, safe, and expeditious manner. The uniformity of chemical action and uniformity of result are thus rendered more certain, and are more perfectly under the control of the operator.

A cylinder or close receiver, a heating device, and an air-blast apparatus suitable for use in the carrying out of our within-described method of treatment are shown and described in our application for Letters Patent of even date herewith.

We do not, however, desire to herein confine ourselves to that particular apparatus in the working of this process, since other mechanism or devices could be employed therefor.

The material or mixed rags, &c., to be treated for the recovery of the animal fibers or wool, in suitable condition for reworking, we immerse for a short time in a chlorine-bath, consisting of chlorine gas held by or dissolved in water, a saturated solution being generally preferable. When thoroughly moistened the material is removed from the bath, and the surplus liquid expelled by pressure or otherwise, leaving the rags in a slightly moist or dry condition, in which state they may be placed within the treating chamber or receiver, which is to be closely stopped or sealed, so as to prevent the escape of gas or chemical fumes. The receiver is then placed within a suitable oven or heating-chamber, in a revolvable position, and the temperature of its contents is raised to a degree sufficient to hasten or insure the chemical action, say 200° to 350° Fahrenheit, or according to the nature of the material and effect desired, the contents being meanwhile agitated, by revolution of the receiver or otherwise, to render the heat uniform throughout the mass, and to cause uniform and rapid chemical action in the disintegration of all of the vegetable fibers or substance contained therein. When the desired degree of elevated temperature has been attained, and sufficient time — fifteen minutes, more or less — has elapsed, suitable pipes or conductors are coupled to the receiver, and a current of air, preferably heated to about the same temperature as the contents of the receiver, more or less, is forced into or through the receiver and its contents, thus rendering complete any chemical action depending on the presence of air or oxygen for its development, and carrying away any vapors or fumes evolved by the previous chemical action within the receiver, which vapors or fumes may be conducted to the chimney-stack or elsewhere for condensation, if desired. The air-current completes the treatment within the receiver, and leaves the rags in a clear, fresh condition to be discharged therefrom, and, if desired, their temperature can be reduced by gradually lowering the temperature of the air forced in.

By confining the material, after its saturation with the chlorine solution, within the chamber or closed receiver, then elevating the temperature and agitating the mass while thus inclosed, and then forcing in the air-blast while the agitation continues and the inclosure is complete, (the pipe-connections excepted,) the process can be conveniently, rapidly, and safely worked, with an increase in the ratio of chemical effect in the separation of the fiber, and without unhealthy effect on the workmen, while the product is discharged in a superior dry and fresh condition, ready for further manipulations on the picking or willowing machines.

What we claim as of our invention, and desire to secure by Letters Patent, is—

The improvement in the art of separating animal fibers from vegetable fibers, consisting in the process hereinbefore described—viz., treating the mixed fibrous material with chlorine solution, heating to an elevated temperature within a closed chamber or receiver, and subsequently passing a current of air through the mass while confined within said chamber, the material being meanwhile agitated, mechanically or otherwise.

Witness our hands this 3d day of July, A. D. 1878.

GEO. M. RICE, 2D.
     ALFRED L. RICE.

Witnesses:
 CHAS. H. BURLEIGH,
 JOS. RUSSEL MARBLE.